3,178,461
PROCESS FOR THE MANUFACTURE OF
10-ACYLOXY-19-NOR-STEROIDS
Oskar Jeger and Kurt Schaffner, Zurich, Switzerland, assignors to Ciba Corporation, New York, N.Y., a corporation of Delaware
No Drawing. Filed May 7, 1963, Ser. No. 278,777
Claims priority, application Switzerland, May 11, 1962, 5,735/62; July 13, 1962, 8,439/62; Mar. 12, 1963, 3,152/63
19 Claims. (Cl. 260—397.4)

The present invention provides a new process for the manufacture of 10-acyloxy-19-norsteroids starting from $\Delta^4$-3-oxo-19-hydroxysteroids. The products of the present process are valuable intermediates for the manufacture of compounds which have a very high pharmacological action and have been used on an especially large scale in therapy in the recent past. This is particularly true of the compounds which belong to the series of the 19-norsteroids, for example 19-nortestosterone, 19-norprogesterone and of the oestratrienes having an aromatic ring A which occur in nature, among which, for example, 19-nortestosterone, 19-nor-17-methyltestosterone, $\Delta^{5(10)}$-3-oxo-17$\beta$-hydroxy-17$\alpha$-ethinyl-19-norandrostene, 19-nor-17$\alpha$-acetoxyprogesterone, 6-dehydro-19-nor-17$\alpha$-acetoxyprogesterone, oestrone and oestradiol are of special value because of their anabolic, progestative, ovulation-inhibiting and oestrogenic action.

Hitherto, the 10-hydroxy-19-norsteroids and 10-acyloxy-19-norsteroids have been accessible only by the detour via the 5:10-unsaturated 19-norsteroids, for example by epoxidation of $\Delta^{5(10)}$-3-oxo-19-nor compounds and subsequent scission of the epoxide (U.S. Patent 2,729,654) or by microbiological oxidation (U.S. Patent 2,888,384).

It has now been observed that when a 19-O-radical is formed in a $\Delta^4$-3-oxo-19-hydroxysteroid the angular substituent in position 10 is eliminated and a 19-nor-steroid is formed, more especially by treatment with a heavy-metal acylate having an oxidizing action, whereupon the starting material is converted into a 10-acyloxy-19-norsteroid.

Thus, according to the process of the invention a $\Delta^4$-3-oxo-19-hydroxysteroid is treated with a heavy-metal acylate having an oxidizing action.

Heavy-metal acylates having an oxidizing action are, above all, acylates of tetravalent lead whose acid component is derived from a lower aliphatic, cycloaliphatic, araliphatic or aromatic acid; for example, they may be lead (IV) acetate, propionate, trimethylacetate, trifluoracetate, hexahydrobenzoate, phenylacetate, benzoate or the like.

The treatment according to the invention is carried out as follows: The starting material, or, if desired, a mixture thereof with a weak inorganic or organic base, for example an alkaline earth metal carbonate such as calcium carbonate, barium carbonate or strontium carbonate, or a tertiary organic base such as pyridine, together with an excess of one of the afore-mentioned heavy-metal acylates, is heated in an apolar solvent, for example to the boiling temperature of the latter, preferably to a temperature above 60° C., and the 10-acyloxy-19-norsteroid obtained as the process product is isolated and separated from any starting material left unreacted by chromatographic purification.

Particularly suitable solvents are aliphatic, cycloaliphatic and aromatic hydrocarbons, for example hexane, heptane, cyclohexane, methylcyclohexane, dimethylcyclohexane, benzene and the like.

In general, the time taken by the reaction depends on the reaction temperature and ranges preferably from ½ to 20 hours.

In the $\Delta^4$-3-oxo-10$\beta$-acyloxy-19-norsteroids obtained, an oxo group present can be reduced, for instance a 17-oxo group can be selectively converted into a 17$\beta$-hydroxyl group, for example with a mild reducing metal hydride complex of the type of the lithium trialkoxy aluminum hydrides, such as lithium trimethoxy or lithium tritertiary butoxy aluminum hydride, in a suitable solvent, such as an ether, for example in diethyl ether, tetrahydrofuran, dioxane or a mixture of the latter with an aromatic hydrocarbon, for example with benzene or toluene, or by treatment with a Grignard compound or an organo-metal compound of the type of lithium acetylide or methyl lithium, for example in the above-mentioned solvents; if desired, this conversion may take place simultaneously with the introduction of a saturated or unsaturated hydrocarbon radical in position 17$\alpha$. There may also be introduced in the products of the invention an additional double bond in position 1-2, more especially by treatment with a dehydrogenating agent, for example with a quinone such as 2:3-dichloro-4:5-dicyanobenzoquinone or tetracyanobenzoquinone, in a suitable solvent, for example in a lower aliphatic, preferably tertiary alcohol, such as tertiary butanol or tertiary amyl alcohol, or in a cyclic ether such as dioxane, or with selenous acid or with a derivative of selenous acid. Particularly suitable are selenium dioxide and esters of selenous acid in a solvent that is inert towards oxidation, for example in a lower aliphatic carboxylic acid, such as acetic or propionic acid, or in a cyclic ether such as dioxane or tetrahydrofuran. The $\Delta^{1,4}$-3-oxo-10$\beta$-acyloxy-19-norsteroids obtained in this manner can be converted in a simple manner into compounds having an aromatic ring A, of the type of oestrone, for example by irradiation (see Helv. Chim. Acta 43, page 500 [1960]), or by reduction, for example with zinc in glacial acetic acid.

As starting materials for use in the present process there are suitable $\Delta^4$-3-oxo-19-hydroxysteroids, for example of the androstane, pregnane, cholestane, spirostane, and cardanolide series. They may contain in one or more than one of the positions 1, 2, 6, 7, 8, 9, 11, 12, 14–17 and in the side chain further substituents, for example alkyl (such as methyl) groups or halogen atoms, also functionally converted (that is to say esterified or etherified) hydroxyl groups and free, ketalized or enolized oxo groups. The compounds may also contain one or more than one double bond, more especially in 6:7-position, in ring D and in the side chain.

Particularly useful starting materials are the $\Delta^4$-3-oxo-19-hydroxyandrostenes and pregnenes, for example $\Delta^4$-3-oxo-19-hydroxyandrostene,
$\Delta^4$-3:17-dioxo-19-hydroxyandrostene,
$\Delta^4$-oxo-17$\beta$-acyloxy-19-hydroxyandrostenes,
$\Delta^4$-3-oxo-17$\beta$-acyloxy-17$\alpha$-alkyl- and -17$\alpha$-alkenyl-19-hydroxyandrostenes, such, for example, as $\Delta^4$-3-oxo-17$\beta$-acyloxy-17$\alpha$-methyl-, -17$\alpha$-ethyl-, -17$\alpha$-vinyl-, -17$\alpha$-trifluorovinyl-, -17$\alpha$-allyl-, 17$\alpha$-methallyl-19-hydroxyandrostenes; furthermore
$\Delta^4$-3:20-dioxo-19-hydroxypregnene,
$\Delta^4$-3:20-dioxo-17$\alpha$-acyloxy-19-hydroxypregnenes,
$\Delta^4$-3:20-dioxo-17$\alpha$:21-diacyloxy-19-hydroxypregnenes,
$\Delta^4$-3:20-dioxo-6$\alpha$-methyl-19-hydroxypregnene, and the corresponding 6-dehydro compounds, such as $\Delta^{4:6}$-3:17-dioxo-19-hydroxyandrostadiene, $\Delta^{4:6}$-3-oxo-17$\beta$-acyloxy-19-hydroxyandrostadiene and $\Delta^{4:6}$-3:20-dioxo-17$\alpha$-acyloxy-19-hydroxypregnadienes.

The afore-mentioned starting materials are known or, if new, can be prepared according to known methods. Advantageously they are prepared from 19-unsubstituted steroids either by microbiological oxidation, or by the process, wherein for example, 3-oxygenated 19-unsubstituted 6β-hydroxy-steroids are treated with a compound containing monovalent positive iodine, or with a metal acylate having an oxidizing action such, for example, as lead tetraacetate, and the resulting 3-oxygenated 6β:19-oxidosteroids are converted under reducing or acylolytic conditions, before or after introduction of the Δ⁴-3-oxo-grouping, into 19-hydroxy or 19-acyloxy compounds respectively. The latter are easy to hydrolyse to 19-hydroxysteroids, if desired selectively. Such processes are described, for example, in copending U.S. patent applications Serial No. 208,610, filed July 9, 1962, and Serial No. 235,850, filed February 6, 1962, by Albert Wettstein et al.

The conversion of the Δ⁴-3-oxo-10-acyloxy-19-nor-steroids obtained by the present process into the therapeutically valuable 10-unsubstituted 19-norsteroids has been described in our copending U.S. patent applications Serial No. 278,775, filed May 7, 1963, and Serial No. 278,776, filed May 7, 1963, according to which a Δ⁴-3-oxo-10-acyloxy-19-nor-steroid is treated either with a reducing agent, for example with zinc in acetic anhydride or with chromium II salts, and, if desired, the resulting Δ⁵⁽¹⁰⁾- or Δ⁵⁽¹⁰⁾:⁶-3-oxo-19-norsteroid is converted by known methods into a Δ⁴-3-oxo-19-norsteroid, or the Δ⁴-3-oxo-10-acyloxy-19-norsteroid is heated, whereupon the compound having an aromatic ring A, of the oestrone type, or its 6-dehydro derivative, is obtained directly in a single stage.

In the above esters the acid radicals are preferably those of aliphatic, cycloaliphatic, araliphatic, heterocyclic or aromatic carboxylic acids, preferably such as contain 1 to 15 carbon atoms, for example formates, acetates, propionates, butyrates, trimethylacetates, oenanthates, caproates, decanoates, cyclopentyl-propionates, valerates, benzoates, furoates, hexahydrobenzoates, phenylpropionates, trifluoroacetates, ethyl or methyl carbonates, and the like.

The following examples illustrate the invention.

Example 1

2 grams of lead tetraacetate are dried for 45 minutes in a high vacuum and then, in admixture with 2 grams of calcium carbonate, boiled in 200 cc. of absolute benzene for a short time. The cooled mixture is then mixed with 2 grams of Δ⁴-3:17-dioxo-19-hydroxyandrostene and the batch is heated at the boil for 14 hours, then poured into water, extracted with ether and the organic phase is dried over anhydrous sodium sulfate and evaporated under vacuum, to yield 2.03 grams of an oily crude product which is chromatographed on neutral alumina (activity III).

Benzene and a 9:1-mixture of benzene and ether elute 1210 mg. of crystals which, after three recrystallizations from acetone:petroleum ether, have a constant melting point of 195–196° C. Optical rotation $[\alpha]_D = +102°$ (c.=0.87). The infra-red absorption spectrum (in chloroform) displays bands at 1732, 1668, 1628 and 1245 cm.⁻¹. Ultra-violet spectrum: $\lambda_{max}$=243 mμ (ε=12,800). The product is Δ⁴-3:17-dioxo-10β-acetoxyoestrene.

With an ether+ethyl acetate mixture there are obtained 572 mg. of crystalline starting material, melting at 164° C., after one crystallization from acetone+petroleum ether. As revealed by the mixing melting point, infra-red spectra and thin-layer chromatogram [solvent system: 9:1-mixture of benzene and methanol] the product is identical with Δ⁴-3:17-dioxo-19-hydroxyandrostene.

Example 2

A stirred suspension of 4.0 grams of previously dried lead tetraacetate and 2.0 grams of calcium carbonate in 200 cc. of cyclohexane is mixed with 1.0 gram of 19-hydroxyprogesterone. The mixture is stirred under reflux for 20 hours, then cooled and filtered through Celite; the residue is exhaustively washed with hexane, the filtrate is extracted with a 10% potassium iodide and sodium thiosulfate solution, dried and evaporated under vacuum at about 35° C. The resulting, partially crystalline, crude product is freed from adhering starting material by being dissolved in benzene and chromatographed on 20 times its own weight of alumina (activity III). By means of the same solvent a total of 635 mg. of pure Δ⁴-3:20-dioxo-10-acetoxy-19-norpregnene is eluted. Its infra-red spectrum contains absorption bands, inter alia, at 1735, 1700, 1670, 1620, 1245 and 10,020 cm.⁻¹. Ultra-violet spectrum: $\lambda_{max}$=242 mμ (log ε=4.05).

Mixtures of benzene and ethyl acetate further yield a total of 315 mg. of 19-hydroxyprogesterone melting at 163–165° C.

Using identical reaction conditions and 500 mg. of Δ⁴-3:20-dioxo-17α-acetoxy-19-hydroxypregnene (melting at 240–242° C.) as starting material, followed by a suitable purification of the resulting crude product, there are obtained 285 mg. of Δ⁴-3:20-dioxo-10:17α-diacetoxy-19-norpregnene melting at 199–201° C.

Example 3

3.5 grams of dry lead tetraacetate are suspended in 200 cc. of methylcyclohexane, mixed with 2.0 grams of previously dried calcium carbonate, and the whole is stirred and heated for 15 minutes at 100° C. 570 mg. of Δ⁴-3-oxo-17β-decanoyloxy-19-hydroxyandrostene, melting at 99–100° C., are then added, and the reaction mixture is refluxed for 5 hours. The cooled solution is filtered to remove inorganic constituents, the residue is washed with methylcyclohexane, and the combined filtrates are evaporated under vacuum at about 35° C. The resulting crude product is dissolved in benzene, and as described in Example 2, chromatographed on alumina, to yield 405 mg. of pure Δ⁴-3-oxo-17β-decanoyloxy-10-acetoxy-19-norandrostene in the form of a colorless oil. The infra-red spectrum of the compound contains absorption bands, inter alia, at 1740 (broad), 1667, 1615 and 1245 cm.⁻¹.

When lead tetraacetate is replaced by lead tetrabenzoate, the final product of the reaction is likewise amorphous Δ⁴-3-oxo-10-benzoyloxy-17β-decanoyloxy-19-norandrostene whose infra-red spectrum contains absorption bands, inter alia, at 1725, 1670, 1620, 1285 and 1120 cm.⁻¹.

In an analogous manner there is obtained, for example, from Δ⁴-3-oxo-17β-acetoxy-17α-methyl-19-hydroxy-androstene, in a yield of 70 to 80% of theory, crude Δ⁴-3-oxo-10:17β-diacetoxy-17α-methyl-19-norandrostene, and Δ⁴-3-oxo-10-benzoyloxy-17β-acetoxy-17α-methyl-19-norandrostene respectively, which compounds can be used without preliminary purification, for example for conversion into Δ⁵⁽¹⁰⁾- or Δ⁴-3-oxo-17β-acetoxy-17α-methyl-19-norandrostene according to our patent application Serial No. 278,775, filed May 7, 1963.

Example 4

A solution of 200 mg. of Δ⁴-3:17-dioxo-10β-acetoxy-19-norandrostene and 400 mg. of 2:3-dichloro-4:5-dicyano-para-quinone in 60 cc. of dioxane is stirred and heated for 17 hours at the boil, then evaporated to dryness under vacuum; the residue is dissolved in a 9:7-mixture of benzene and chloroform and the solution is filtered through neutral alumina (activity III), to yield 130 mg. of Δ¹:⁴-3:17-dioxo-10β-acetoxy-19-norandrostadiene which decomposes at 180–200° C. after four recrystallizations from actone+petroleum ether. $[\alpha]_D = +38°$ (c.=1.37). Ultraviolet spectrum: $\lambda_{max}$=250 mμ (ε=14,480). Infrared spectrum in chloroform: $\nu_{max}$=1730–1740 (broad), 1665, 1628, 1611, 1249 cm.⁻¹.

Example 5

A solution of 98 mg. of Δ⁴-3:17-dioxo-10β-acetoxy-19-norandrostene in 10 cc. of tetrahydrofuran is added dropwise at 0° C. to a suspension of 200 mg. of lithium tritertiary butoxy aluminum hydride in 5 cc. of tetrahydrofuran and the reaction mixture is stirred for 20 minutes at 0° C. The excess reducing agent is decomposed with 10 cc. of aqueous acetic acid of 5% strength, the whole is extracted with ether, and the organic phase is washed with sodium bicarbonate solution and with water. When the resulting crude product is recrystallized once from acetone+petroleum ether, it yields 70 mg. of pure $\Delta^4$-3-oxo-10$\beta$-acetoxy - 17$\beta$-hydroxy - 19 - norandrostene melting at 153–156° C. Optical rotation $[\alpha]_D = +49°$ (c.=1.10). Ultraviolet spectrum: $\lambda_{max}=244$ m$\mu$ ($\epsilon=15,150$). Infrared spectrum in chloroform: $\nu_{max}$ 3620, 1733, 1666, 1625, 1250 cm.$^{-1}$.

Example 6

260 mg. of $\Delta^4$-3-oxo-10$\beta$-acetoxy-17$\beta$-hydroxy-19-norandrostene in 10 cc. of a 1:1-mixture of acetic anhydride and pyridine are acetylated for 12 hours at room temperature. On working up the reaction mixture furnishes 250 mg. of $\Delta^4$ - 3 - oxo-10$\beta$:17$\beta$-diacetoxy-19-norandrostene melting at 124–126° C. after two recrystallizations from acetone+petroleum ether. Infrared spectrum in chloroform: $\lambda_{max}=1725$–135 (broad), 1669, 1627, 1250 cm.$^{-1}$. Optical rotation $[\alpha]_D = +29°$ (c.=0.97).

Example 7

A solution of 150 mg. of $\Delta^4$-3-oxo-10$\beta$:17$\beta$-diacetoxy-19-norandrostene in 6 cc. of tertiary butanol and 0.8 cc. of glacial acetic acid is mixed with 100 mg. of selenium dioxide and the whole is boiled for 6 hours while being stirred. Another 100 mg. of selenium dioxide are then added and the mixture is heated for 30 minutes longer. The cooled solution is decanted, the residue is washed with ethyl acetate and evaporated under vacuum. The residue is taken up in ethyl acetate and the solution is successively washed with sodium bicarbonate, ammonium bisulfite, ammonia solution, sulfuric acid and water. Yield: 165 mg. of an oil which is chromatographed on neutral alumina (activity III). A 9:1-mixture of benzene and chloroform elutes 46 mg. of $\Delta^{1:4}$-3-oxo-10$\beta$:17$\beta$-diacetoxy-19-norandrostadiene which, after one recrystallization from aqueous methanol, melts at 213–215° C. Optical rotation $[\alpha]_D = -32°$ (c.=0.87, in chloroform). $[\alpha]_D = -30°$ (c.=0.80, in dioxane). Infrared spectrum in chloroform: $\nu_{max}=1725$ (broad), 1660, 1621, 1600, 1240 cm.$^{-1}$.

Example 8

A suspension of 36 grams of previously dried lead tetraacetate and 10 grams of calcium carbonate in 2 liters of benzene is boiled for a short time, whereupon 10.0 grams of $\Delta^{4:6}$-3:17-dioxo-19-hydroxyandrostadiene are added. The reaction mixture is boiled under reflux for 1½ hours, filtered after cooling, the filtrate is washed with potassium iodide and sodium thiosulfate solution of 5% strength, dried and evaporated under a water-jet vacuum. The crude product obtained (11.2 g.) is either recrystallized from methylene chloride-acetone or preferably chromatographed on neutral alumina (activity III) and yields the $\Delta^{4:6}$-3:17-dioxo-10$\beta$-acetoxy-19-norandrostadiene melting at 165° C., $[\alpha]_D^{25} = +162°$ (c.=0.6 in chloroform); yield 70 to 80%.

Example 9

According to the method described in Example 8, 1.2 grams of $\Delta^{4:6}$-3:20-dioxo-17$\alpha$-acetoxy-19-hydroxypregnadiene are heated together with 4.0 grams of lead tetraacetate, 1.2 grams of calcium carbonate and 250 cc. of benzene and worked up. There are obtained 1.5 grams of a semicrystalline crude product which yields after chromatography on neutral alumina (activity III) 810 milligrams of pure $\Delta^{4:6}$-3:20-dioxo-10$\beta$:17$\alpha$-diacetoxy-19-norpregnadiene melting at 190° C. Its infrared spectrum contains absorption bands, inter alia, at 5.75, 5.79, 6.00, 6.17, 6.27 and 8.19$\mu$, ultra-violet spectrum: $\lambda_{max}=285$ m$\mu$, $\epsilon=23,000$.

What is claimed is:

1. Process for the manufacture of 10$\beta$-acyloxy-19-norsteroids, wherein a $\Delta^4$-3-oxo-19-hydroxysteroid is treated with a heavy-metal acylate having an oxidizing action.
2. Process according to claim 1, wherein an acylate of tetravalent lead is used as heavy metal acylate.
3. Process according to claim 2, wherein lead tetraacetate is used.
4. Process according to claim 1, wherein the treatment with a heavy metal acylate is carried out in an apolar solvent.
5. Process according to claim 4, wherein a member selected from the group consisting of benzene and cyclohexane is used.
6. Process according to claim 1, wherein the treatment with a heavy metal acylate is carried out in the presence of a weak base.
7. Process according to claim 6, wherein calcium carbonate is used.
8. Process according to claim 1, wherein $\Delta^4$-3-oxo-19-hydroxy-androstenes are used as starting material.
9. Process according to claim 1, wherein $\Delta^4$-3-oxo-19-hydroxy-pregnenes are used as starting material.
10. Process according to claim 1, wherein $\Delta^{4:6}$-3-oxo-19-hydroxy-androstadienes are used as starting material.
11. Process according to claim 1, wherein $\Delta^{4:6}$-3-oxo-19-hydroxy-pregnadienes are used as starting material.
12. Process according to claim 1, wherein $\Delta^4$-3:17-dioxo-19-hydroxy-androstene is used as starting material.
13. Process according to claim 1, wherein $\Delta^4$-3:20-dioxo-17$\alpha$-acetoxy-19-hydroxy-pregnene is used as starting material.
14. Process according to claim 1, wherein $\Delta^{4:6}$-3:17-dioxo-19-hydroxy-androstadiene is used as starting material.
15. Process according to claim 1, wherein $\Delta^{4:6}$-3:20-dioxo - 17$\alpha$ - acetoxy - 19 - hydroxy-pregnadiene is used as starting material.
16. $\Delta^{4:6}$-3-oxo-10$\beta$ - acyloxy - 19 - norandrostadienes in which acyloxy is derived from a carboxylic acid having up to 15 carbon atoms.
17. $\Delta^{4:6}$-3:17-dioxo-10$\beta$-acetoxy-19-norandrostane.
18. $\Delta^{4:6}$-3-oxo - 10$\beta$ - acyloxy - 19 - norpregnadienes in which acyloxy is derived from a carboxylic acid having up to 15 carbon atoms.
19. $\Delta^{4:6}$-3:20-dioxo-10$\beta$:17$\alpha$-diacetoxy-19 - norpregnadiene.

References Cited by the Examiner

UNITED STATES PATENTS

| | | | |
|---|---|---|---|
| 2,729,654 | 1/56 | Colton | 260—397.4 |
| 2,882,282 | 4/59 | Agnello et al. | 260—397.3 |
| 2,891,079 | 6/59 | Dodson et al. | 260—397.4 |
| 2,910,486 | 10/59 | Jiu | 260—397.4 |

OTHER REFERENCES

Amorosa et al.: Helv. Chim. Acta, pp. 2674–2698 (1962).

LEWIS GOTTS, *Primary Examiner.*

UNITED STATES PATENT OFFICE
CERTIFICATE OF CORRECTION

Patent No. 3,178,461                          April 13, 1965

Oskar Jeger et al.

It is hereby certified that error appears in the above numbered patent requiring correction and that the said Letters Patent should read as corrected below.

Column 6, line 45, for "-norandrostane" read -- -norandrostadiene --.

Signed and sealed this 18th day of January 1966.

(SEAL)
Attest:

ERNEST W. SWIDER                         EDWARD J. BRENNER
Attesting Officer                           Commissioner of Patents